United States Patent [19]

Watanabe et al.

[11] Patent Number: 5,378,777

[45] Date of Patent: Jan. 3, 1995

[54] PROCESS FOR PRODUCING STYRENIC POLYMER AND COPOLYMER

[75] Inventors: Masami Watanabe; Shuji Machida, both of Sodegaura, Japan

[73] Assignee: Idemitsu Kosan Co., Ltd., Tokyo, Japan

[21] Appl. No.: 110,766

[22] Filed: Aug. 23, 1993

Related U.S. Application Data

[63] Continuation of Ser. No. 858,873, Mar. 27, 1992, abandoned.

[30] Foreign Application Priority Data

Mar. 29, 1991 [JP] Japan .................................. 3-089071
Mar. 29, 1991 [JP] Japan .................................. 3-089072

[51] Int. Cl.$^6$ ........................ C08F 4/643; C08F 12/14
[52] U.S. Cl. .................................... 526/134; 526/114; 526/115; 526/116; 526/128; 526/132; 526/149; 526/160; 526/170; 526/279; 526/347.1
[58] Field of Search ............... 526/114, 115, 116, 128, 526/132, 134, 149, 160, 170

[56] References Cited

U.S. PATENT DOCUMENTS 4,412,050 10/1983 Mehta .
4,680,353 7/1987 Ishihara et al. .................. 526/346 X
5,066,741 11/1991 Campbell, Jr. .................. 526/346 X

FOREIGN PATENT DOCUMENTS 0277003 8/1988 European Pat. Off. .
0277004 8/1988 European Pat. Off. .
0389981 10/1990 European Pat. Off. .
0421659 4/1991 European Pat. Off. .
0567659 1/1986 France .
62-104818 5/1987 Japan .
62-187708 8/1987 Japan .
63-241009 10/1988 Japan .
3-205412 9/1991 Japan .

OTHER PUBLICATIONS

Journal of the American Chemical Society, vol. 108, No. 23, Nov. 12, 1986, pp. 7410–7411, R. F. Jordan, et al., "Ethylene Polymerization by a Cationic Dicyclopentadienylzirconium(IV) Alkyl Complex".

Journal of American Chemistry Society, vol. 109, pp. 4111–4113, R. F. Jordan, et al., "Chemistry of Cationic Zirconium(IV) Benzyl Complexes. One-Electron Oxidation of d$^0$ Organometallics".

Journal of Polymer Science, vol. 26, No. 112, 1957, pp. 120–123, G. Natta, et al., "The Nature of Some Soluble Catalysts for Low Pressure Ethylene Polymerization".

Journal of American Chemistry Society, vol. 79, 1957, D. S. Breslow, et al., "Bis-(Cyclopentadienyl)Titanium Dichloride-Alkylaluminum Complexes as Catalysts for the Polymerization of Ehtylene".

Journal of Polymer Science: Part C, vol. 16, 1967, pp. 2333–2339, F. S. Dyachkovskii, et al., "The Role of Free Ions in Reactions of Olefins with Soluble Complex Catalysts".

Primary Examiner—Fred Teskin
Attorney, Agent, or Firm—Oblon, Spivak, McClelland, Maier, & Neustadt

[57] ABSTRACT

There is disclosed a process for producing a styrenic polymer or copolymer each having syndiotactic configuration which comprises polymerizing a styrenic monomer represented by the general formula (I)

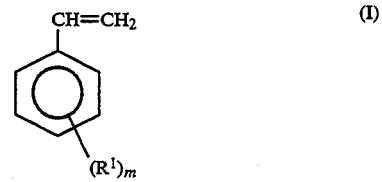

such as phenylstyrene and trimethylsilylstyrene, or copolymerizing at least two styrenic monomers of the formula (I) or at least one styrenic monomer of the formula (I) with at least one styrenic monomer other than the styrenic monomer of the formula (I) in the presence of a catalyst comprising as principal ingredients (A) a transition metal compound derived from a group IVB metal of the Periodic Table such as pentamethylcyclopentadienyltrimethyltitanium and (B) a compound producing an ionic complex by the reaction with the above transition metal compound such as tri(n-butyl)ammonium tetra(pentafluorophenyl)borate. The aforementioned process enables efficient production of a styrenic polymer or copolymer excellent in heat resistance and mechanical strength.

11 Claims, No Drawings

PROCESS FOR PRODUCING STYRENIC POLYMER AND COPOLYMER

This application is a continuation of application Ser. No. 07/858,873, filed on Mar. 27, 1992, now abandoned.

BACKGROUND OF THE INVENTION

1. Field of the Invention

The present invention relates to a process for producing a styrenic polymer and copolymer. More particularly, it pertains to a process for efficiently producing a phenylstyrenic polymer, silicon-containing group-substituted styrenic polymer and copolymer thereof by the use of a specific catalyst.

2. Description of the Related Arts

Heretofore, styrenic polymers produced by the radical polymerization method have been molded to various shapes by various molding methods and widely used as domestic electrical appliances, office machines, household goods, packaging containers, toys, furnitures, synthetic papers and other industrial materials. Because of their atactic configuration in stereochemical structure, however, such styrenic polymers have suffered the disadvantages of inferior heat resistance and chemical resistance.

In order to solve the above-mentioned disadvantages of the styrenic polymers having atactic configuration, the group of the present inventors succeeded in the development of the styrenic polymers having a syndiotactic configuration, and further an arylstyrenic polymer excellent in heat resistance (refer to Japanese Patent Application Laid-Open Nos. 104818/1987, 187708/1987 and 241009/1988, and Japanese Patent Application No. 257484/1990), and still furthermore a silicon-containing styrenic polymer having excellent heat resistance and oxygen enriching capability (refer to Japanese Patent Application No. 201425/1990).

Nevertheless, the above disclosed processes still involve various problems such as expensiveness of the catalyst to be used, insufficient polymerization activity and necessity of deashing process. Specifically a production process by the use of a transition metal compound/aluminoxane catalyst requires a large amount of aluminoxane as compared with a transition metal compound, thus making deashing process indispensable owing to a much content of the residual catalyst in the polymer produced.

Meanwhile, the polymerization of an olefinic monomer by a cationic transition metal complex has been reported since many years ago. For example, (1) Natta et. al reported the polymerization of ethylene using the composition of titanocene dichloride and triethylaluminum as the catalyst (J. Polymer Sci., 26, 120 (1957)). Breslow et. al reported the polymerization of ethylene by the use of titanocene dichloride and dimethylaluminum chloride as the catalyst (J. Chem. Soc, 79, 5072 (1957)). Further, Dyachkovskii et. al suggested that the polymerization activity of ethylene by the use of titanocene dichloride and dimethylaluminum chloride as the catalyst is based on monomethyl titanocene cations (J. Polymer Sci., PART C 16, 2333 (1967)). However, the activity of ethylene according to the above-mentioned methods is extremely low.

In addition, (2) Jordan et. al reported the synthesis of biscyclopentadienylzirconium methyl(tetrahydrofuran)tetraphenyl borate by the reaction of dimethyl zirconocene with silver tetraphenylborate, isolation of the reaction product and the polymerization of ethylene by the use thereof (J. Am, Chem. Soc, 108, 7410 (1986)), and also the synthesis of biscyclopentadienylzirconium benzyl(tetrahydrofuran) tetraphenylborate by the reaction of benzyl zirconocene with ferrocenium tetraphenylborate and isolation of the reaction product (J. Am. Chem. Soc. 109, 4111 (1987)). It was confirmed that ethylene was slightly polymerized by the aforestated catalyst, but the polymerization activity was extremely low.

Moreover, (3) Turner et. al proposed a method for polymerizing α-olefin by the use of the combination of a boron complex containing a specific amine such as triethylammonium tetraphenylborate, triethylammonium tetratolylborate, triethylammonium tetra(pentafluorophenyl)borate and a metallocene as the catalyst (refer to Japanese Patent Application through PCT Laid-Open No. 502036/1989). However, the aforestated catalyst systems (1) through (3) are applicable only to the restricted polymerization, that is, homopolymerization of an α-olefin and copolymerization of α-olefinic comonomers and at the present time, are not actually evolved to the polymerization of a styrenic monomer.

SUMMARY OF THE INVENTION

It is the general object of the present invention to provide a process for efficienty producing a phenylstyrenic polymer or copolymer each having excellent heat resistance.

It is another object of the present invention to provide a process for efficiently producing a silicon-containing styrenic polymer or copolymer each having excellent heat resistance and oxygen enriching capability.

Other objects of the present invention will be obvious from the text of the specification hereinafter disclosed.

In view of the above-mentioned circumstances, intensive research and investigation were concentrated to attain the aforestated objects. As a result, it has been found that the use of a specific coordination complex compound as one component of the catalyst in place of aluminoxane can achieve the objects hereinbefore described. The present invention has been accomplished on the basis of the foregoing finding and information.

The present invention provides a process for producing a styrenic polymer or copolymer each having syndiotactic configuration which comprises polymerizing a styrenic monomer or copolymerizing at least two styrenic monomers represented by the general formula (I)

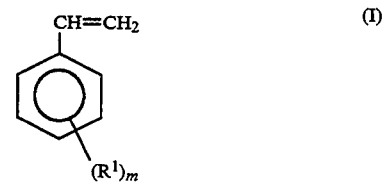

wherein $R^1$ is a hydrogen atom, phenyl group or silicon-containing group and m is an integer from 1 to 5 provided that at least one of $R^1$ is a phenyl group or silicon-containing group in the presence of a catalyst comprising as principal ingredients (A) a transition metal compound derived from a group IVB metal of the Periodic Table and (B) a compound producing an ionic complex by the reaction with said transition metal compound. (Process (1)).

The present invention further provides a process for producing a styrenic copolymer having syndiotactic configuration which comprises copolymerizing a styrenic monomer represented by the general formula (I) and a styrenic monomer other than the above (hereinafter sometimes referred to as "other styrenic monomer") in the presence of a catalyst comprising as principal ingredients the above-mentioned components (A) and (B). (Process (2)).

DESCRIPTION OF PREFERRED EMBODIMENTS

In the styrenic monomer represented by the general formula (I) to be used in the Processes (1) and (2), $R^1$ is a hydrogen atom, phenyl group or silicon-containing group, existing in "m" number/s, that is, an integer from 1 to 5, and when m is a plural number, $R^1$ may be the same or different provided that at least one of $R^1$ in "m" number/s must be a phenyl group or silicon-containing group.

In the case of $R^1$ being a phenyl group, the substitution point thereof may be any of ortho, meta and para placements, of which para placement is particularly desirable. Accordingly the optimum phenylstyrene represented by the general formula (I) is p-phenylstyrene. A silicon-containing group in the aforesaid styrenic monomer is preferably a group having a silicon-carbon bond, silicon-silicon bond or silicon-oxygen bond. As is the case with the phenyl group, the substitution point of $R^1$ as a silicon-containing group may be any of ortho, meta and para placement, of which para placement is particularly desirable.

Examples of the silicon-containing styrenic monomer represented by the general formula (I) include alkylsilylstyrenes such as p-trimethylsilylstyrene, m-trimethylsilylstyrene, o-trimethylsilylstyrene, p-triethylsilylstyrene, m-triethylsilylstyrene, o-triethylsilylstyrene and p-dimethyl-tert-butylsilylstyrene; phenyl group-containing silylstyrenes such as p-dimethylphenylsilylstyrene, p-methyldiphenylsilylstyrene and p-triphenylsilylstyrene; hydroxyl group-containing silylstyrenes such as p-dimethylhydrosilylstyrene, p-methyldihydrosilylstyrene and p-trihydrosilylstyrene; halogen-containing silylstyrene such as p-dimethylchlorosilylstyrene, p-methyl-dichlorosilylstyrene, p-trichlorosilylstyrene, p-dimethyl-bromosilylstyrene and p-dimethyliodosilylstyrene; alkoxy-group containing silylstyrene such as p-dimethylmethoxysilylstyrene, p-methyldimethoxysilylstyrene, and p-trimethoxysilylstyrene; silyl group-containing silylstyrene such as p-(p-trimethylsilyl)dimethylsilylstyrene; silyl group-containing methylstyrene such as p-bis(trimethylsilyl)methylstyrene; ω-silyl substituted alkylstyrene such as p-(2-trimethylsilyl ethyl)styrene, p-(3-trimethylsilyl propyl)styrene, p-(4-trimethylsilyl butyl)styrene, p-(8-trimethylsilyl octyl)styrene; siloxysilylstyrene such as p-trimethylsiloxydimethylsilylstyrene; and the like.

Other styrenic monomer to be used in the Process (2) according to the present invention includes a variety of monomers and is not specifically limited insofar as it is copolymerizable with the styrenic monomer of the general formula (I). Examples of preferable other styrenic monomer include alkyl ring-substituted styrenes such as styrene, p-methylstyrene, o-methylstyrene, m-methylstyrene, 2,4-dimethylstyrene, 2,5-dimethylstyrene, 3,4-dimethylstyrene, 3,5-dimethylstyrene and p-tert-butylstyrene; α-alkylstyrenes such as α-methylstyrene; halogenated styrenes such as p-chlorostyrene, p-bromostyrene, m-bromostyrene, p-fluorostyrene, m-fluorostyrene, o-fluorostyrene and o-methyl-p-fluorostyrene.

According to the process of the present invention, a styrenic monomer of the general formula (I) is polymerized, or copolymerized with another styrenic monomer of the general formula (I) or other styrenic monomer. Being the principal component in the case of copolymerization, p-phenylstyrene or para-substituted silicon-containing styrene is copolymerized with each other or with another styrenic monomer such as m-phenylstyrene, o-phenylstyrene, meta or ortho-substituted silicon-containing styrene or the like.

The catalyst to be used in the above-mentioned polymerization or copolymerization comprises (A) a transition metal compound derived from a group IVB metal of the Periodic Table and (B) a compound producing an ionic complex by the reaction with said transition metal compound.

Preferable component; (A) a transition metal compound derived from a group IVB metal of the Periodic Table includes cyclopentadienyl compound or derivatives thereof represented by the general formula (II), (III) or (IV)

$$CpM^1R^2{}_aR^3{}_bR^4{}_c \qquad (II)$$

$$Cp_2M^1R^2{}_dR^3{}_e \qquad (III)$$

$$(Cp\text{---}A_f\text{---}Cp)M^1R^2{}_dR^3{}_e \qquad (IV)$$

wherein $M^1$ is a Ti atom, Zr atom or Hf atom; Cp is cyclopentadienyl group, substituted cyclopentadienyl group, indenyl group, substituted indenyl group, tetrahydroindenyl group, substituted tetrahydroindenyl group, fluorenyl group or substituted fluorenyl group; $R^2$, $R^3$ and $R^4$ are each a hydrogen atom, an oxygen atom, a halogen atom, an alkyl group having 1 to 20 carbon atoms, an alkoxy group having 1 to 20 carbon atoms, an aryl group, an alkylaryl group, an arylalkyl group each having 6 to 20 carbon atoms, an acyloxy group having 1 to 20 carbon atoms:, a substituted acetylacetonato group, a substituted acetylacetonato group, a substituent containing silicon atom or a ligand such as a carbonyl, an oxygen molecule, a nitrogen molecule, a Lewis base, an unsaturated chain hydrocarbon or unsaturated cyclic hydrocarbon; A is crosslinkage by covalent bond; a, b and c are each an integer from 0 to 3; d and e are each an integer from 0 to 2; f is an integer from 0 to 5; at least two out of $R^2$, $R^3$ and $R^4$ may together form a ring; and when Cp has a substituent, the substituent is preferably an alkyl group having 1 to 20 carbon atoms.

Examples of the substituted cyclopentadienyl group in the above-mentioned formulae (II) to (IV) include methylcyclopentadienyl group; ethylcyclopentadienyl group; isopropylcyclopentadienyl group; 1,2-dimethylcyclopentadienyl group; tetramethylcyclopentadienyl group; 1,3-dimethylcyclopentadienyl group; 1,2,3-trimethylcyclopentadienyl group; 1,2,4-trimethylcyclopentadienyl group; pentamethylcyclopentadienyl group and trimethylsilylcyclopentadienyl group. Specific examples of $R^2$, $R^3$ and $R^4$ include F, Cl, Br and I as halogen atom; methyl, ethyl, n-propyl, isopropyl, n-butyl, octyl and 2-ethylhexyl group as alkyl group having 1 to 20 carbon atoms; methoxy, ethoxy, propoxy, butoxy and phenoxy group as alkoxy group having 1 to 20 carbon atoms; phenyl, tolyl, xylyl and benzyl group as aryl, alkylaryl or arylalkyl group each having 6 to 20 carbon atoms; heptadecylcarbonyloxy group as acyloxy group having 1 to 20 carbon atoms; trimethylsilyl and (trimethylsilyl)methyl group as substituent containing silicon atom; as Lewis base, ethers such as dimethyl ether, diethyl ether and tetrahydrofuran; thioethers such as tetrahydrothiophene; esters such as ethylbenzoate; nitriles such as acetonitrile and benzonitrile; amines such as trimethylamine, triethylamine, tributylamine, N,N-dimethylaniline, 2,2′-bipyridine and phenanthroline; phosphine such as triethylphosphine and triphenylphosphine; unsaturated chain hydrocarbon such as ethylene, butadine, 1-pentene, isoprene, pentadiene, 1-hexene and derivatives thereof; unsaturated cyclic hydrocarbon such as benzene, toluene, xylene, cycloheptatriene, cyclooctadiene, cyclooctatriene, cyclooctatetraene and derivatives thereof. Examples of A, that is, crosslinkage by covalent bond include methylene, dimethylmethylene, ethylene, dimethylsilylene, dimethylgermylene and dimethylstannylene crosslikage.

Particularly desirable compounds among those of the formulae (II), (III) and (IV) are those of formula (II) in which at least two of $R^2$, $R^3$ and $R^4$ are each an alkyl group having 1 to 20 carbon atoms or an aryl group having 6 to 20 carbon atoms and those of formula (III) and (IV) in which at least one of $R^2$ and $R^3$ are each the same as above.

Specific examples of the compound represented by the formula (II) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, methylcyclopentadienyltribenzyltitanium, 1,2-dimethylcyclopentadienyltrimethyltitanium, tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, pentamethylcyclopentadienyltriphenyltitanium, pentamethylcyclopentadienyltribenzyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, cyclopentadienyldimethylmethoxytitanium, methylcyclopentadienyldimethylmethoxytitanium, pentamethylcyclopentadienylmethyldiethoxytitanium, trimethylsilylcyclopentadienyltrimethyltitanium, indenyltitanium trichloride, indenyltitanium trimethoxide, indenyltitanium triethoxide, indenyltrimethyltitanium and indenyltribenzyltitanium.

Specific examples of the compound represented by the formula (III) include bis(cyclopentadienyl)dimethyltitanium; bis(cyclopentadienyl)diphenyltitanium; bis(cyclopentadienyl)diethyltitanium; bis(cyclopentaidenyl)dibenzyltitanium; bis(methylcyclopentadienyl)dimethyltitanium; bis(pentamethylcyclopentadienyl)dimethyltitanium; bis(methylcyclopentadienyl)dibenzyltitanium; bis(pentamethylcyclopentadienyl)dibenzyltitanium; bis(pentamethylcyclopentadienyl)chloromethyltitanium; and bis(pentamethylcyclopentadienyl)hydridomethyltitanium.

Specific examples of the compound represented by the formula (IV) include ethylenebis(indenyl)dimethyltitanium; ethylenebis(tetrahydroindenyl)dimethyltitanium; and dimethylsilylenebis(cyclopentaidenyl)dimethyltitanium.

In addition to the above-mentioned titanium compounds, there may be used tetramethoxytitanium, tetraethoxytitanium, tetra-n-butoxytitanium, tetraisopropoxytitanium, titanium tetrachloride, titanium trichloride, dimethoxytitanium dichloride, methoxytitanium trichloride and trimethoxytitanium monochloride.

As mentioned hereinbefore, the component (B) is used in combination with the component (A) to constitute the catalyst in the process according to the present invention. The component (B) is not specifically limited in its kind insofar as it is a compound producing an ionic complex by the reaction with the transition metal compound of the component (A). Preferable examples of the component (B) include a coordination complex compound comprising a cation and an anion in which a plurality of radicals are bonded to a metal selected from Groups VB, VIB, VIIB, VIII, IB, IIB, IIIA, IVA and VA of the Periodic Table.

The coordination complex compound is not specifically limited in its kind, but the compound represented by the formula (V) or (VI) are preferably usable.

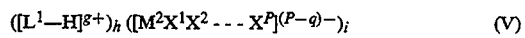

$$([L^1-H]^{g+})_h ([M^2X^1X^2 \cdots X^P]^{(P-q)-})_i \quad \text{(V)}$$

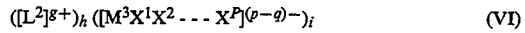

$$([L^2]^{g+})_h ([M^3X^1X^2 \cdots X^P]^{(P-q)-})_i \quad \text{(VI)}$$

wherein $L^2$ is $M^4$, $R^5R^6M^5$ or $R^7{}_3C$; $L_1$ is a Lewis base; $M^2$ and $M^3$ are each an element selected from Groups VB, VIB, VIIB, VIII, IB, IIB, IIIA, IVA and VA of the Periodic Table; $M^4$ is a metal selected from Groups IB, IIB and VIII of the Periodic Table; $M^5$ is a metal selected from Group VIII of the Periodic Table; $X^1$ to $X^p$ are each a hydrogen atom, dialkylamino group, alkoxy group, aryloxy group, alkyl group having 1 to 20 carbon atoms, aryl group, having 6 to 20 carbon atoms, alkylaryl group, arylalkyl group substituted alkyl group, organometalloid group or halogen atom; $R^5$ and $R^6$ are each a cyclopentadienyl group, substituted cyclopentadienyl group, indenyl group or fluorenyl group; $R^7$ is a hydrocarbon radical; q is the valency of each of $M^2$ and $M^3$, indicating an integer of 1 to 7; p is an integer of 2 to 8; g is the ion valency of each of $[L^1-H]$ and $[L^2]$, indicating an integer of 1 to 7; h is an integer of 1 or more; and $i=h \times g/(p-q)$.

Specific examples of the Lewis base represented by $L^1$ include ethers such as dimethyl ether, diethyl ether and tetrahydrofuran; thioethers such as tetrahydrothiophene; esters such as ethylbenzoate; nitriles such as acetonitrile and benzonitrile; amines such as trimethylamine, triethylamine, tributylamine, N,N-dimethylaniline, 2,2'-bipyridine and phenanthroline; phophine such as triethylphosphine and triphenylphosphine; unsaturated chain hydrocarbon such as ethylene, butadine, 1-pentene, isoprene, pentadiene, 1-hexene and derivatives thereof; unsaturated cyclic hydrocarbon such as benzene, toluene, xylene, cycloheptatriene, cyclooctadiene, cyclooctatriene, cyclooctatetraene and derivatives thereof.

Specific examples of $M^2$ and $M^3$ include B, Al, Si, P, As, Sb, etc.; those of $M^4$ include Li, Na, Ag, Cu, etc.; and those of $M^5$ include Fe, Co, Ni, etc. Specific examples of $X^1$ to $X^p$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or aralkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid group such as pentamethylantimony group, trimethylsilyl group, trimethylgermyl group, diphenylarsine group, dicyclohexylanitmony group and diphenylboron group. Specific examples of substituted cyclopentadienyl of $R^5$ and $R^6$ include methylcyclopentadienyl, butyl-cyclopentadienyl and pentamethylcyclopentadienyl.

Among the compounds represented by the above-mentioned general formula V or VI specific examples of preferably usable compounds include, as the compound of formula (V), triethylammonium tetraphenylborate, tripropylammonium tetraphenylborate, tri(n-butyl)ammonium tetraphenylborate, tri(n-butyl)ammonium tetra(o,p-dimethylphenyl)borate, trimethylammonium tetraphenylborate, tri(n-butyl)ammonium tetra(p-trifluorophenyl)borate, triphenylphosphonium tetraphenylborate, tri(methylphenyl)phosphonium tetraphenylborate, tri(dimethylphenyl)phosphonium tetraphenylborate, isopropylammonium tetra(pentafluorophenyl)borate, dicyclohexylammonium tetraphenylborate, triethylammonium tetra(pentafluorophenyl)borate, tri(n-butyl)ammonium tetra(pentafluorophenyl)borate, triethylammonium hexafluoroarsenate, dimethylanilinium tetra(pentafluorophenyl)borate, diethylanilinium tetra(pentafluorophenyl)borate, n-butylanilinium tetra(pentafluorophenyl)borate, methyldiphenylammonium tetra(pentafluorophenyl)borate and p-bromo-N,N'-dimethylanilinium tetra(pentafluorophenyl)borate, and as the compound of formula (VI), ferrocenium tetraphenyl borate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetraphenylborate, silver tetra(pentafluorophenyl)borate, trityltetraphenylborate, trityltetra(pentafluorophenyl)borate, silver hexafluoroarsenate, silver hexafluoroantimonate, silver tetrafluoroborate, etc.

In the process of the present invention, when necessary, in addition to the aforestated components (A) and (B) as the principal components, there may be used (C) an organoaluminum compound represented by the general formula (VII), (VIII) or (IX).

$$R^8{}_k AlY_{3-k} \qquad (VII)$$

wherein $R^8$ is a hydrocarbon radical such as alkyl group having 1 to 18, preferably 1 to 12 carbon atoms, alkenyl group, aryl group or aralkyl group; Y is a hydrogen atom or halogen atom; and K satisfies $1 \leq k \leq 3$. Specific examples include trimethylaluminum, triethylaluminum, triisobutylaluminum, dimethylaluminum chloride, diethylaluminum chloride, methylalumnium dichloride ethylaluminum dichloride.

The general formula (VIII) represents a chain aluminoxane;

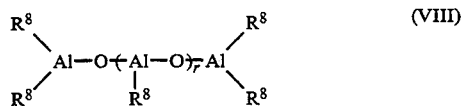

wherein $R^8$ is as defined above and r is degree of polymerization usually ranging from 1 to 50.

The general formula (IX) represents a repeating unit constituting a cyclic aluminoxane;

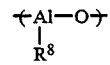

wherein $R^8$ is as defined above and the preferable number of the repeating units is 20 to 50.

The catalyst to be used in the process according to the present invention comprises the above-mentioned components (A) and (B) or (A), (B) and (C) as the principal components. In this case the compounding ratio of the components (A) to (B) is not specifically limited, but usually it is 1:0.01 to 1:100, preferably 1:1 to 1:10 in terms of molar ratio of (A) to (B). The molar ratio of the monomer to the transition metal in the component (A) is 1 to $10^8$ preferably 100 to $10^7$.

The polymerization process according to the present invention may be put into practice by any of bulk, solution and suspension polymerization.

The usable solvents when used in the polymerization are exemplified by aliphatic hydrocarbons such as pentane, hexane and heptane, alicyclic hydrocarbons such as cyclohexane and aromatic hydrocarbons such as benzene, toluene and xylene, of which at least two may be used in combination. The monomer/solvent ratio may be arbitrarily selected. The polymerization conditions are not specifically limited, but polymerization temperature shall be $-100°$ to $250°$ C., preferably $0°$ to $80°$ C., polymerization time shall be 5 min. to 24 hours, preferably 1 hour or longer and polymerization pressure is not specifically limited.

For the purpose of modifying the molecular weight of the polymer to be obtained, it is effective to carry out polymerization reaction in the presence of hydrogen.

The components (A) and (B) may be brought into contact with each other in advance to form the contact product, which is to be separated and washed for use, or may be brought into contact in the polymerization system. The amount of the component (C) to be used is usually 0 to 100 mol per mol of the component (A). The component (C), when used in combination with the components (A) and (B), can improve the polymerization activity, but an excessively large amount thereof can not develop the effect corresponding to the amount. It may be brought into contact with the component (A)

or (B), or the contact product of (A) and (B) prior to the start of or during the polymerization by successively adding to the reaction system.

According to the process of producing a copolymer of the present invention, a styrenic monomer of the general formula (I) is combined with a different styrenic monomer of the same formula (I) or at least one other styrenic monomer to produce a copolymer having at least two types of repeating units. Since the styrenic monomer of the formula (I) or other styrenic monomer is not limited to one species but may be used in two or more species, the copolymer obtained by the process according to the present invention includes a terpolymer and quadripolymer in addition to a bipolymer.

The styrenic polymer obtained by Process (1) according to the present invention has syndiotactic configuration in terms of its stereostructure. Moreover, the styrenic copolymer obtained by Process (2) according to the same is of syndiotactic configuration not only in the bond between the repeating unit I, that is, the repeating unit derived from styrenic monomer of general formula I, but also in the bond between the repeating unit I and the repeating unit II, that is, the repeating unit derived from the other styrenic monomer, which configuration is referred to as cosyndiotactic configuration. Thus, the copolymer of a styrenic monomer of the formula (I) and other styrenic monomer is embodied in block copolymer, random copolymer and alternating copolymer with respect to the repeating units I and II.

The proportion of the repeating unit I in the copolymer of the repeating units I and II is arbitrarily selected, and the Process (2) of the present invention enables the production of the copolymer having non-limitative proportion of the repeating unit I. However, in the case where the repeating unit is derived from phenylstyrene monomer, especially from p-phenylstyrene monomer the proportion of the repeating unit I is 50 to 99.9 mol %, preferably 60 to 99.5 mol % so as to afford the copolymer excellent in heat resistance. In the case where the repeating unit I is derived from a silicon-containing styrenic monomer, especially a silicon-containing group para-substituted styrenic monomer, the aforementioned proportion is 50 to 99.9 mol %, preferably 60 to 99.5 so as to afford the copolymer excellent in heat resistance and oxygen enriching capability.

An excessive proportion of the repeating unit derived from other styrenic monomer sometimes results in a product with inferior heat resistance due to lowered crystallinity.

The polymer and copolymer obtained by the process according to the present invention have syndiotactic configuration in terms of stereoregularity.

Here, the styrenic polymer which has syndiotactic configuration means that its stereochemical structure is of syndiotactic configuration, i,e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic copolymers having such sundiotactic configuration as mentioned in the present invention usually means a (co)polymer having such syndiotacticity that the proportion of racemic diad is at least 75%, preferably at least 85%, or the proportion of racemic pentad is at least 30%, preferably at least 50% in the main chain structure of styrenic repeating units. However, the degree of syndiotactic configuration varies to some extent depending on the types of substituents and the like.

By virtue of using a highly active and comparatively inexpensive catalyst, the process according to the present invention is capable of reducing the requirement of the catalyst in the production of a styrenic polymer and copolymer as well as the residual catalyst contained in the polymer and copolymer obtained, thus unnecessitating or simplifying the deashing process, and therefore enables efficient production of a styrenic polymer and copolymer having a high degree of syndiotactic configuration in its stereochemical structure along with the reduction of the catalyst cost. Consequently the polymer and copolymer obtained by the process of the present invention prove to be resin excellent in heat resistance and mechanical strength as well as improved and stabilized in physical properteis and hue and find a wide diversity of effective applications as raw materials of various molded products.

In what follows, the present invention will be described in more detail with reference to examples and comparative examples.

EXAMPLE 1

(1) Preparation of tri(n-butyl)ammonium tetra(pentafluorophenyl)borarate

Pentafluorophenyllithium which was prepared from 152 mmol of bromopentafluorobenzene and 152 mmol of butyllithium in hexane at $-78°$ C., was reacted with 65 mmol of trichloroboron in hexane at $-78°$ C., and hexane soluble portion was separated by filtration at $-78°$ C. to obtain solid component, to which was added hexane. The temperature was allowed to rise to room temperature and hexane soluble portion was separated by filtration to obtain a solution of tri(pentafluorophenyl)boron in hexane, 41 mmol of which was reacted with 41 mmol of pentafluorophenyllithium prepared in the same manner as above in diethyl ether to produce lithium tetra(pentafluorophenyl)boron as white solid and isolate the same.

Then, 16 mmol of lithium tetra(pentafluorophenyl)boron thus obtained was reacted with 16 mmol of tri-n-butylamine hydrochloride in water to produce 12.8 mmol of tri(n-butyl)ammonium tetra(pentafluorophenyl)borate as white solid.

(2) Production of p-phenylstyrene Polymer

In a reaction vessel dried and purged with argon were placed at room temperature 2 ml of toluene, 0.03 mmol of triisobutylaluminum (TIBA) and 8.8 ml ($8.8 \times 10^{-3}$ mol) of p-phenylstyrene solution in toluene adjusted to a concentration of (1 mol/l) to maintain at 70° C. for 30 min.

Subsequently, to the above mixture were added 0.5 $\mu$mol of pentamethylcyclopentadienyltrimethyltitanium and further 0.5 $\mu$mol of tri(n-butyl)ammonium tetra(pentafluorophenyl)borate to react for 2 hours. Thereafter, the reaction product was poured in methanol to arrest reaction, followed by filtration and washing with methanol three times. The product was dried under reduced pressure to produce 0.85 g of polymer. The molecular weight of the polymer was determined by means of gel-permeation chromatographey (GPC) under the following conditions. As a result, the weigh-average molecular weight (Mw) thereof was 124000 experssed in terms of polystyrene (PS).

Apparatus: Waters ALS/GPC 150C
Column : TSK HM+GMH6x2 (produced by TOSOH Co., Ltd.)
Temperature: 135° C.
Solvent : 1,2,4-trichlorobenzene
Flow rate: 1.0 ml/min.

The polymer as poly(4-vinylbiphenyl) was subjected to Soxhlet extraction by the use of methyl ethyl ketone (MEK) as the solvent for 4 hours with the result that insoluble portion was 99%. As a result of analysis by means of Differential Scanning Caloriemetry (DSC), the polymer had a melting point of 352° C. (temperature raising rate of 20° C./min, at the first heating), proving itself to be a crystalline high polymer.

As a result of $^{13}$C-NMR (100 MHz) analysis of the polymer, sharp peaks assignable to quaternary carbons of biphenyl ring as side chain were observed at 141.0 ppm and 144.0 ppm, demonstrating the syndiotactic configuration with a syndiotacticity of 93% in terms of racemic pentad.

EXAMPLE 2-4

The procedure in Example 1 (2) was repeated except that a prescribed amount of styrene as a styrenic monomer was added to the system simultaneously with p-phenylstyrene to produce a copolymer.

The composition of the copolymer was determined by calibration method for IR spectrum wherein poly(4-vinylbiphenyl) obtained by radical polymerization and syndiotactic polystyrene synthesized by a known method were uniformly mixed each in a prescribed amount, each of them was analyzed for IR spectrum to obtain the ratio of peak intensity at 696 cm$^{-1}$ to that at 814 cm$^{-1}$, a calibration curve was prepared from the above mixing ratio and peak intensity ratio, and the compositional ratio of the copolymer was determined from the ratio of peak intensity at 696 cm$^{-1}$ to that at 814 cm$^{-1}$ for the copolymer by the use of the above-prepared calibration curve. The results are given in Table 1, proving the melting points each higher than 300° C. and syndiotactic configuration of the copolymer thus obtained.

EXAMPLE 5 and 6

The procedure in Example 3 was repeated except that p-methylstyrene or m-phenylstyrene was used as the styrenic monomer to effect copolymerization. The composition thereof was determined by analyzing the unreacted monomers that were recovered from the copolymerizing reaction system by means of gas chromatography. The results are given in Table 1.

COMPARATIVE EXAMPLES 1 and 2

The procedure in Example 1 (2) or Example 3 was repeated except that the catalyst components in the above Example were altered to methylaluminoxnae (MAO), TIBA, and/or pentamethylcyclopentadienyl-titanium trimethoxide (Cp*Ti(OMe)$_3$). The results are given in Table 1.

TABLE 1

| | Phenyl- | | |

TABLE 1-continued

| | styrene monomer (mmol) | Catalyst Component (A) (μmol) | Component (B) (μmol) |
|---|---|---|---|
| Example 1 | p-phenyl-styrene (8.75) | Cp*TiMe$_3$ (0.5) | [n-Bu$_3$NH][B(C$_6$F$_5$)$_4$] (0.5) |
| Example 2 | p-phenyl-styrene (8.31) | Cp*TiMe$_3$ (0.5) | [n-Bu$_3$NH][B(C$_6$F$_5$)$_4$] (0.5) |
| Example 3 | p-phenyl-styrene (7.87) | Cp*TiMe$_3$ (0.5) | [n-Bu$_3$NH][B(C$_6$F$_5$)$_4$] (0.5) |
| Example 4 | p-phenyl-styrene (7.00) | Cp*TiMe$_3$ (0.5) | [n-Bu$_3$NH][B(C$_6$F$_5$)$_4$] (0.5) |
| Example 5 | p-phenyl-styrene (7.87) | Cp*TiMe$_3$ (0.5) | [n-Bu$_3$NH][B(C$_6$F$_5$)$_4$] (0.5) |
| Example 6 | p-phenyl-styrene (8.38) | Cp*TiMe$_3$ (0.5) | [n-Bu$_3$NH][B(C$_6$F$_5$)$_4$] (0.5) |
| Comparative Example 1 | p-phenyl-styrene (8.75) | Cp*Ti(OMe)$_3$ (4) | MAO (0.8 mmol) |
| Comparative Example 2 | p-phenyl-styrene (7.00) | Cp*Ti(OMe)$_3$ (4) | MAO (0.8 mmol) |

| | Catalyst Component (C) (mmol) | Species of comonomer (mmol) | yield (g) | Catalyst activity titanium activity (kg/g Ti) | Catalyst activity aluminum activity (kg/g Al) |
|---|---|---|---|---|---|
| Example 1 | TIBA (0.03) | — | 0.85 | 35.5 | 1.05 |
| Example 2 | TIBA (0.03) | styrene (0.44) | 0.80 | 33.4 | 0.99 |
| Example 3 | TIBA (0.03) | styrene (0.88) | 0.72 | 30.1 | 0.89 |
| Example 4 | TIBA (0.03) | styrene (1.75) | 0.65 | 27.1 | 0.80 |
| Example 5 | TIBA (0.03) | p-methyl-styrene (0.88) | 0.86 | 35.9 | 1.06 |
| Example 6 | TIBA (0.03) | m-phenyl-styrene (0.37) | 0.80 | 33.4 | 0.99 |
| Comparative Example 1 | TIBA (0.8) | — | 0.15 | 0.78 | 0.0035 |
| Comparative Example 2 | TIBA (0.8) | styrene (1.75) | 0.59 | 3.08 | 0.014 |

| | Polymer or Copolymer melting point (°C.) | MEK insoluble portion (%) | comonomer content (mol %) | Mw |
|---|---|---|---|---|
| Example 1 | 352 | 99 | — | 880000 |
| Example 2 | 340 | 98 | 8.0 | 750000 |
| Example 3 | 325 | 97 | 17 | 480000 |
| Example 4 | 300 | 96 | 31 | 320000 |
| Example 5 | 330 | 98 | 15 | 500000 |
| Example 6 | 350 | 98 | 0.2 | 790000 |
| Comparative Example 1 | 344 | 99 | — | 96000 |
| Comparative Example 1 | 294 | 98 | 33 | 48000 |

TIBA: triisobutylaluminum: polymerization temperature; 70° C.
MAO: methylaluminoxane: polymerization time; 2 hours
Cp*: pentamethylcyclopentadienyl group
MEK: methyl ethyl ketone
n-Bu: n-butyl

EXAMPLE 7

Production of p-trimethylsilylstyrene Polymer

In a reaction vessel dried an purged with argon were placed at room temperature 10 ml of toluene, 15.4 g (8.75×10$^{-2}$ mol) of 4-trimethylsilylstyrene and as the catalyst component 0.03 mmol of TIBA to allow the mixture to stand for 30 min. Thereafter to the mixture were added 0.5 μmol of tri(n-butyl)ammonium tetra(pentafluorophenyl)borate as prepared in Example 1 (1) and 0.5 μmol of pentamethylcyclopentadienyltrimethyltitanium to carry out polymerizing reaction for 4 hours. Then the reaction product was poured in methanol to arrest reaction, followed by filtration and washing with methanol three times. The product was dried under reduced pressure to produce 6.35 g of polymer. The molecular weight of the polymer was determined by means of gel-permeation chromatography (GPC) under the following conditions. As a result, the weight-average molecular weight (Mw) thereof was 3200000 expressed in terms of polystyrene.

Apparatus: Water ALS/GPC
Column: TSK GH8P+TSK GMH6 produced by TOSOH Co., Ltd., HITACHI GL-A120+HITACHI GL-A130 produced by HITACHI Mfg Co., Ltd.
Temperature: room temperature
Solvent: chloroform; injection amount: 500 μl
Flow rate: 1.4 ml/min. concentration: 10 mg/5 ml The polymer was analyzed by means of DSC under the conditions of (1) first heating from 30° C. to 320° C. at 20° C./min, (2) maintained at 325° C. for 5 min., (3) first cooling from 320° C. to 30° C. at 7° C./min., (4) maintained at 30° C. for 5 min., and (5) second heating from 30° C. to 320° C. at 20° C./min., and the melting point (Tm) observed during second heating was 309.5° C.

As a result of analysis by $^{13}$C-NMR (270 MHz: mixed solvent of TCB/heavy benzene=8/2 by volume, cyclosilane D18, −0.327 ppm standard, 130° C.), a sharp peak assignable to quaternary carbons of aromatic ring was observed at around 145.8 ppm, demonstrating the syndiotactic configuration with a syndiotacticity of not less than 95% in terms of racemic pentad.

EXAMPLES 8 and 9

Production of p-trimethylsilylstyrene/styrene Copolymer

Copolymerization was carried out in the same manner as Example 7 by varying the feed ratio of p-trimethylsilylstyrene to styrene. The composition of the copolymer thus obtained was calculated in $^{13}$C-NMR analysis from the ratio of peak area at around 145 ppm to that at around 146 ppm. The results are given in Table 2. Also as a result of $^{13}$C-NMR analysis, a sharp peak assignable to quaternary carbons of aromatic ring was observed at around 146 ppm, demonstrating the syndiotactic configuration.

EXAMPLE 10

Production of p-trimethylsilylstyrene/p-methylstyrene Copolymer

The procedure of Example 8 was repeated except that p-methylstyrene was used in place of styrene to carry out copolymerizing reaction. The composition of the copolymer thus obtained was calculated in $^{13}$C-NMR analysis from the ratio of peak area at around 142 ppm to that at around 146 ppm. The results are given in Table 2. Also as a result of $^{13}$C-NMR analysis, a sharp peak assignable to quaternary carbons of aromatic ring was observed at around 146 ppm, demonstrating the syndiotactic configuration.

EXAMPLE 11

Production of p-trimethylsilylmethylstyrene Polymer

The procedure in Example 7 was repeated except that p-trimethylsilylmethylstyrene was used in place of p-trimethylsilylstyrene to effect copolymerizing reaction.

EXAMPLE 12

Production of p-trimethylsilylmethylstyrene/p-methylstyrene Copolymer

The procedure of Example 8 was repeated except that p-trimethylsilylmethylstyrene was used in place of p-trimethylsilylstyrene to effect copolymerizing reaction.

EXAMPLE 13

Production of p-bis(trimethylsilyl)methylstyrene/styrene Copolymer

The procedure of Example 9 was repeated except that p-bis(trimethylsilyl)methylstyrene was used in place of p-trimethylsilylstyrene.

COMPARATIVE EXAMPLES 3 and 4

The procedure in Example 7 was repeated except that catalyst components as listed in Table 2 were used. The addition of the catalyst and monomer was carried out in the order of firstly adding the solution of TIBA and MAO in toluene to the reaction system, secondly adding p-trimethylsilylstyrene to the system, followed by standing at 70° C. for 30 min. and then adding $C_p{}^*$Ti(OMe)$_3$ to the system. The results are shown in Table 2.

TABLE 2

| | p-trimethyl-silyl-styrene (mmol) | Catalyst Component (A) (μmol) | Catalyst Component (B) (μmol) |
|---|---|---|---|
| Example 7 | 87.5 | Cp*TiMe$_3$ (0.5) | [n-Bu$_3$NH][B(C$_6$F$_5$)$_4$] (0.5) |
| Example 8 | 83.1 | Cp*TiMe$_3$ (0.5) | [n-Bu$_3$NH][B(C$_6$F$_5$)$_4$] (0.5) |
| Example 9 | 55.5 | Cp*TiMe$_3$ (0.5) | [n-Bu$_3$NH][B(C$_6$F$_5$)$_4$] (0.5) |
| Example 10 | 83.1 | Cp*TiMe$_3$ (0.5) | [n-Bu$_3$NH][B(C$_6$F$_5$)$_4$] (0.5) |
| Example 11 | 87.5*[1] | Cp*TiMe$_3$ (0.5) | [n-Bu$_3$NH][B(C$_6$F$_5$)$_4$] (0.5) |
| Example 12 | 83.1*[1] | Cp*TiMe$_3$ (0.5) | [n-Bu$_3$NH][B(C$_6$F$_5$)$_4$] (0.5) |
| Example 13 | 55.5 | Cp*TiMe$_3$ (0.5) | [n-Bu$_3$NH][B(C$_6$F$_5$)$_4$] (0.5) |
| Comparative Example 3 | 87.5 | Cp*Ti(OMe)$_3$ (2) | MAO (0.4)*[3] |
| Comparative Example 4 | 87.5 | Cp*Ti(OMe)$_3$ (0.5) | MAO (0.1)*[3] |

| | Catalyst Component (C) (mmol) | Species of comonomer (mmol) | yield (g) | Catalyst activity titanium activity (kg/g Ti) | Catalyst activity aluminum activity (kg/g Al) |
|---|---|---|---|---|---|
| Example 7 | TIBA (0.03) | — | 6.35 | 265 | 7.84 |
| Example 8 | TIBA (0.03) | styrene (4.38) | 6.05 | 252 | 7.47 |
| Example 9 | TIBA (0.03) | styrene (32) | 5.43 | 227 | 6.70 |
| Example 10 | TIBA (0.03) | p-methyl-styrene (4.38) | 6.30 | 263 | 7.79 |

TABLE 2-continued

| | | | | | |
|---|---|---|---|---|---|
| Example 11 | TIBA (0.03) | — | 3.51 | 147 | 4.34 |
| Example 12 | TIBA (0.03) | p-methyl-styrene (4.38) | 3.69 | 155 | 4.56 |
| Example 13 | TIBA (0.03) | styrene (32) | 4.11 | 172 | 5.08 |
| Comparative Example 3 | TIBA (0.4) | — | 15.4 | 160.8 | 0.71 |
| Comparative Example 4 | TIBA (0.1) | — | 0.92 | 38.4 | 0.17 |

| | Polymer or Copolymer | | |
|---|---|---|---|
| | melting point (°C.) | comonomer content (mol %) | Mw |
| Example 7 | 309.5 | — | 3200000 |
| Example 8 | 261 | 4.2 | 3020000 |
| Example 9 | none | 34 | 2000000 |
| Example 10 | 263 | 4.1 | 3100000 |
| Example 11 | 230 | — | 1600000 |
| Example 12 | 201 | 3.8 | 1700000 |
| Example 13 | none | 41 | 980000 |
| Comparative Example 3 | 298.4 | — | 2100000 |
| Comparative Example 4 | 302 | — | 420000 |

*¹4-trimethylsilylstyrene
*²4-bis(trimethylsilyl)styrene
*³millimol (mmol)
polymerization temperature: 70° C.
polymerization time: 2 hours

What is claimed is:

1. A process for producing a styrenic polymer or copolymer, each having syndiotactic configuration, which comprises polymerizing a styrenic monomer or copolymerizing at least two styrenic monomers each represented by the general formula (I)

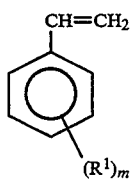

(I)

wherein $R^1$ is a hydrogen atom or silicon-containing group and m is an integer from 1 to 5 provided that at least one of $R^1$ is a silicon-containing group in the presence of a catalyst comprising as principal ingredients (A) a transition metal compound derived from a group IVB metal of the Periodic Table and (B) a compound producing an ionic complex by the reaction with said transition metal compound, wherein said compound (B) is a compound represented by formula (V)

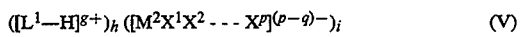

(V)

wherein $L^1$ is a Lewis base; $M^2$ is an element selected from the elements of groups VB, VIB, VIIB, VIII, IB, IIB, IIIA, IVA and VA of the Periodic Table; $X^1$ to $X^p$ are each independently a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; q is the valency of $M^2$ and is an integer of 1 to 7; p is an integer of 2 to 8; g is the ion valency of $[L^1—H]$ and is an integer of 1 to 7, h is an integer of 1 or more and $i = h \times g/(p-q)$.

2. The process according to claim 1, wherein the catalyst comprises as principal ingredients said components (A) and (B) and (C) an organoaluminum compound.

3. The process according to claim 1, wherein the styrenic monomer comprises a silicon-containing group substituted styrene as a principal ingredient.

4. The process according to claim 3, wherein the silicon-containing group substituted styrene is a silicon-containing group para-substituted styrene.

5. The process according to claim 3, wherein the silicon-containing group substituted styrene is p-trimethylsilylstyrene or p-trimethylsilylmethylstyrene.

6. A process for producing a styrenic copolymer having syndiotactic configuration which comprises copolymerizing at least one styrenic monomer represented by the formula (I) wherein each symbol is as defined in claim 1 with at least one styrenic monomer other than said styrenic monomer of the formula (I) in the presence of a catalyst comprising as principal ingredients (A) a transition metal compound derived from a group IVB metal of the Periodic Table and (B) a compound producing an ionic complex by the reaction with said transition metal compound and represented by the formula (V) wherein each symbol is as defined in claim 1.

7. The process according to claim 6, wherein the catalyst comprises as principal ingredients said components (A) and (B) and (C) an organoaluminum compound.

8. The process according to claim 6, wherein said styrenic monomer of the formula (I) is a silicon-containing group para-substituted styrene and said styrenic monomer other than the styrenic monomer of the formula (I) is selected from styrene, alkyl ring-substituted styrene, α-alkylstyrene, halogenated styrene, m-phenylstyrene and o-phenylstyrene.

9. The process according to claim 6, wherein the proportion of the structural unit derived from the styrenic monomer of the formula (I) in the styrenic copolymer is 50 to 99.9 mol % and the proportion of the structural unit derived from the other styrenic monomer is 50 to 0.1 mol %.

10. The process according to claim 6, wherein the proportion of the structural unit derived from the styrenic monomer of the formula (I) in the styrenic copolymer is 60 to 99.5 mol % and the proportion of the structural unit derived from the other styrenic monomer is 40 to 0.5 mol %.

11. The process according to claim 6, wherein the styrenic monomer of the formula (I) is p-trimethylsilylstyrene or p-trimethylsilylmethylstyrene, and said styrenic monomer other than the styrenic monomer of the formula (I) is styrene or p-methylstyrene.

* * * * *